United States Patent [19]

Parsons

[11] E Re. 29,439

[45] Reissued Oct. 11, 1977

[54] CERTAIN 1,2,4-OXA- AND -THIADIAZOL-5-YLTHIOALKANOIC ACID DERIVATIVES

[75] Inventor: John Henry Parsons, Saffron Walden, England

[73] Assignee: Fisons Limited, England

[21] Appl. No.: 628,732

[22] Filed: Nov. 4, 1975

Related U.S. Patent Documents

Reissue of:

[64] Patent No.: 3,770,754
Issued: Nov. 6, 1973
Appl. No.: 80,165
Filed: Oct. 12, 1970

[30] Foreign Application Priority Data

Oct. 18, 1969 United Kingdom ..... 51248/69

[51] Int. Cl.[2] ..... C07D 271/06; C07D 285/08

[52] U.S. Cl. ..... 260/302 SD; 71/90; 260/307 G; 424/270; 424/272

[58] Field of Search ..... 260/302 SD, 307 G

[56] References Cited

U.S. PATENT DOCUMENTS 3,051,570 8/1962 Dersch et al. ..... 96/67

FOREIGN PATENT DOCUMENTS 1,025,055 4/1966 United Kingdom ..... 260/302
1,328,964 9/1973 United Kingdom ..... 260/302 SD

OTHER PUBLICATIONS

Noguchi et al., *Yakazu Zasshi*, 88(11), 1437–1449 (1968).

*Primary Examiner*—R. Gallagher
*Attorney, Agent, or Firm*—Wenderoth, Lind & Ponack

[57] ABSTRACT

New nematocides and plant growth regulants comprise diazoles of formula,

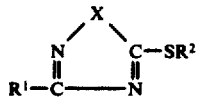

in which $R^1$ is alkyl, substituted alkyl, aryl, or substituted aryl, $R^2$ is alkyl, alkenyl, alkynyl or substituted alkyl and X is oxygen or sulphur.

38 Claims, No Drawings

CERTAIN 1,2,4-OXA- AND -THIADIAZOL-5-YLTHIOALKANOIC ACID DERIVATIVES

Matter enclosed in heavy brackets [ ] appears in the original patent but forms no part of this reissue specification; matter printed in italics indicates the additions made by reissue.

*This is a reissue application of U.S. 3,770,754 which matured from Ser. No. 80,165, filed Oct. 12, 1970.*

The present invention relates to new diazoles useful as biocides and plant growth regulants, to biologically active compositions containing the same, to their use as biocides and plant growth regulants and to their preparation.

Accordingly the present invention is for the new diazoles of the Formula I, (I)

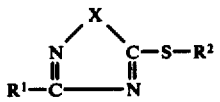

in which $R^1$ is selected from alkyl (for example of 1–6 carbon atoms, such as methyl, ethyl or propyl) substituted alkyl (for example of 1–6 carbon atoms substituted by halogen, alkoxy, carboxy, hydroxy or nitro, such as chloromethyl, ethoxyethyl or carboxyethyl), aryl (for example phenyl or naphthyl) and substituted aryl (for example phenyl substituted by halogen alkyl, alkoxy or nitro, such as chlorophenyl tolyl, methoxyphenyl [or nitrophenyl] or nitrophenyl); in which $R^2$ is selected from alkyl (for example of 1–12 carbon atoms such as methyl, ethyl, octyl or decyl) substituted [alky] *alkyl* (for example substituted by carboxy, halogen, nitrile or alkoxy, such as carboxymethyl, carboxyethyl, cyanomethyl, dichloroethyl or ethoxyethyl), alkenyl (for example of 2–6 carbon atoms such as vinyl or allyl) and alkynyl (for example of 2–6 carbon atoms such as propargyl); and in which X is oxygen or sulphur. In the case where $R^2$ represents alkyl substituted by carboxy, the present invention also includes functional derivatives, e.g. salts, esters and amides of such acids.

Unless another range is stated above it is preferred that any alkyl or alkoxy groups in the compounds of Formula I are lower alkyl groups.

Compounds according to the present invention which may be mentioned include:

(3-p-chlorophenyl-1,2,4-oxadiazol-5-ylthio)acetic acid, (3-phenyl-1,2,4-thiadiazol-5-ylthio)acetic acid, (3-methyl-1,2,4-thiadiazol-5-ylthio)acetic acid and 3-methyl-5-methylthio-1,2,4-thiadiazole.

The present invention is also for a biologically active composition which contains as an active ingredient a diazole of Formula I; such a composition suitably also contains at least one material selected from the group comprising carriers, wetting agents, diluents and solvents.

The present invention is also for a process for the treatment of plants, the soil, land or aquatic areas, for the control of unwanted plants or pests, or for the modification of plants, which comprises applying thereon or thereto a diazole of Formula I or a composition containing the same.

The diazoles of Formula I may be prepared by the treatment of the corresponding 5-mercapto substituted diazole of Formula II, (II)

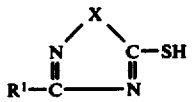

with a halide of the formula $R^2Z$ (in which Z is a halogen such as chlorine or bromine) or with a sulphate of the formula $(R^2)_2SO_4$, $R^1$, $R^2$ and X having the significances indicated above.

The reaction is preferably carried out in the presence of an acid binding agent; for example potassium carbonate. The reaction may also be carried out in a solvent which is inert under the reaction conditions, e.g. water or acetone.

The diazoles of the Formula I may also be prepared by the reaction of the corresponding 5-halo substituted diazole of Formula III, (III)

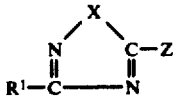

with a mercaptan of formula $R^2SH$, in which formulae $R^1$, $R^2$, X and Z [are] are defined above.

Certain of the compounds of Formula II are new compounds and are embraced as such within the present invention. These new compounds may be prepared as follows:

Those compounds of Formula II in which X is sulphur (the 5-mercapto-1,2,4-thiadiazoles) may be prepared from an amidoxime and carbon disulphide in the presence of an alkoxide according to the reaction scheme:

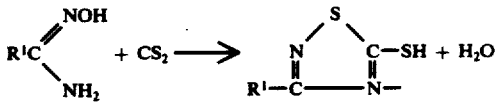

$R^1$ being as defined above.

The compounds of Formula II in which X is oxygen (the 5-mercapto-1,2,4-oxadiazoles) may be prepared from the same starting materials, but in the presence of an organic nitrogen base, for example pyridine or triethylamine, according to the reaction scheme:

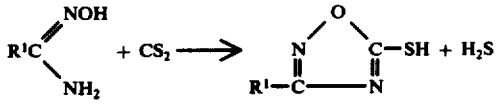

They may also be prepared by reacting an amidoxime with thiophosgene according to the reaction scheme:

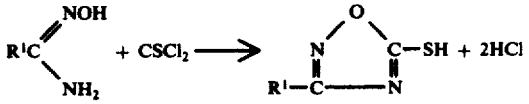

$R_1$ being as defined above.

They may also be prepared by reacting an amidoxime with phosgene, or a chloroformate, to form the compound of Formula X,

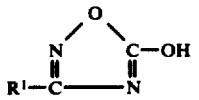

(X)

in which $R^1$ is as defined above, and conversion of the 5-hydroxy group in the compound of Formula X to a mercapto group, using, for example, phosphorus oxychloride followed by thiourea, an alkali metal xanthate or an alkali metal sulphide.

The compounds of Formula III may be made from known starting materials using techniques conventional for the production of similar known compounds, for example by reacting the corresponding 1,2,4-oxadiazol-5-one or 1,2,4-thiadiazol-5-one with a [phosphoros] *phosphorous* halide or a phosphorous oxyhalide.

The diazoles of Formula I are active inter alia as nematocides, as herbicides and as plant growth regulants. To some extent the particular activity is related to structure, and thus the compounds where $R^2$ is carboxy substituted alkyl are particularly active as herbicides and/or as plant growth regulants, and the compounds where $R^2$ is alkyl or alkynyl are particularly active as nematocides.

For use as nematocides for the treatment of soil the diazoles are generally used at a rate of about 10–1000 parts per million of soil (based on the top 2 inches of soil).

For use as herbicides, the diazoles are generally used at a rate in excess of 5 pounds per acre, for example 5–20 pounds per acre.

For use as plant growth regulants, the diazoles are generally used at a rate of less than 10 pounds per acre, for example 0.25 to 10 pounds per acre.

Examples of plants on which the compounds may be used as plant growth regulants are fruit trees, vegetables, and ornamental plants, e.g., apple trees, french beans and chrysanthemums.

The compositions according to the present invention, in concentrate form prior to dilution for application where appropriate suitably contain 0.5–80% by weight, for example 10–50% by weight, of the diazoles.

The diazoles of Formula I may be incorporated into biologically active compositions in any of the usual ways. Thus for example the said compounds may be dissolved or dispersed in aqueous or organic solvent solutions with or without wetting agents.

If desired diazoles of Formula I may be dissolved in a water immiscible solvent, for example a high boiling hydrocarbon, suitably containing dissolved emulsifying agents, so as to act as a self-emulsifiable oil on addition to water.

The diazoles of Formula I may also be admixed with a wetting agent with or without an inert diluent to form a wettable powder which is soluble or dispersible in water, or may be mixed with the inert diluent [ot] *to* form a solid or powdery product.

Inert diluents with which the diazoles may be incorporated include solid inert media comprising powdered or divided solid materials, for example, clays, sands, talc, mica, peat, fertilizers and soil, such products either comprising dust or larger particle size materials. If desired the diazoles of Formula I may be used to impregnate or coat preformed granules such as limestone or peat granules.

The wetting agents used may comprise anionic compounds such as for example soaps, fatty sulphate esters, such as dodecyl sodium sulphate, fatty aromatic sulphonates, such as alkylbenzene sulphonates or butyl naphthalene sulphonates, or more complex fatty sulphonates such as the amide condensation product of oleic acid and N-methyl taurine or the sodium sulphonate of dioctyl succinate.

The wetting agents may also comprise non-ionic wetting agents, for example condensation products of fatty acids, fatty alcohols or fatty substituted phenols with ethylene oxide, or fatty esters of sugars or polyhydric alcohols, or the products obtained from the latter by condensation with ethylene oxide, or the products known as block copolymers of ethylene oxide and propylene oxide. The wetting agents may also comprise cationic agents, for example cetyl trimethylammonium bromide and the like.

The biologically active compositions according to the present invention may contain in addition to the said compounds other active materials, for example pesticides such as DDT, carbaryl, dimethoate and the like; herbicides, for example 2,4-dichlorophenoxy-acetic acid, 2-methyl-4-chlorophenoxyacetic acid, substituted triazines or ureas and the like; or fungicides such as copper compounds, dithiocarbamates and the like.

A specific group of compounds of Formula I are those in which $R^1$ represents lower alkyl, phenyl, halophenyl, lower alkoxy phenyl or lower alkylphenol and $R^2$ represents alkyl of 1 to 12 carbon atoms, lower alkenyl, lower alkynyl, or lower alkyl substituted by carboxy or nitrile. Preferred compounds of Formula I are those in which $R^2$ represents methyl substituted by carboxy.

The compounds of Formula I, in which $R^2$ represents alkyl substituted by carboxy, may be used in the form of their functional derivatives, for example their amides, esters (e.g. lower alkyl esters) or salts with suitable cations, e.g., alkali metal salts such as the sodium salts, or salts with amines, e.g. the triethanolamine salts.

The invention is illustrated, but in no way limited by the following examples in which the parts and percentages are by weight unless otherwise indicated.

EXAMPLE 1

A mixture of p-chlorobenzamidoxime (170 parts), carbon disulphide (76 parts), triethylamine (101 parts) and pyridine (170 parts) was heated at 70° C. for three days. The solution was evaporated to dryness and the residue washed with 3-normal hydrochloric acid and recrystallised from benzene to give 3-(p-chlorophenyl)-5-mercapto-1,2,4-oxidazole (130 parts, 61% yield), melting point 145–147° C.

Found (percent): C, 45.10; H, 2.50; Cl, 16.55. $C_6H_5ClN_2OS$ requires (percent): C, 45.18; H, 2.37; Cl, 16.67.

A mixture of 3-(p-chlorophenyl)-5-mercapto-1,2,4-oxadiazole (106 parts), chloroacetic acid (48 parts), potassium carbonate (75 parts) and water (100 parts) was heated at reflux for one hour. The solution was filtered hot, cooled, acidified and the solid separated to give [3-(p-chlorophenyl)-1,2,4-oxadiazol-5-ylthio]acetic acid (91 parts, 67% yield), melting point 112–114° C. (as monohydrate).

Found (percent): C, 41.80; H, 2.90; N, 9.55. $C_{10}H_7ClN_2O_3S.H_2O$ requires (percent): C, 41.88; H, 3.14; N, 9.62.

EXAMPLE 2

A mixture of benzamidoxime (270 parts) carbon disulphide (152 parts), 5-normal sodium methoxide (40 parts) and ethanol (200 parts) were heated at reflux for 16 hours. The solution was evaporated to dryness and the residue washed with 3-normal hydrochloric acid to give 5-mercapto-3-phenyl-1,2,4-thiadiazole (152 parts, 39% yield), melting point 147–148° C.

Found (percent): C, 49.30; H, 3.25; N, 14.20. $C_8H_6N_2S_2$ requires (percent): C, 49.47; H, 3.12; N, 14.43.

A mixture of 5-mercapto-3-phenyl-1,2,4-thiadiazole (76 parts), potassium carbonate (58 parts), chloroacetic acid (38 parts) and water (100 parts) was heated at reflux for 1 hour. The solution was filtered hot, cooled, acidified, and the solid separated to give (3-phenyl-1,2,4-thiadiazol-5-ylthio)acetic acid (50 parts, 51% yield), melting point 97° C.

Found (percent): C, 47.40; H, 3.15; N, 11.00. $C_{10}H_8N_2O_2S_2$ requires (percent): C, 47.62; H, 3.20; N, 11.11.

The sodium salt of this acid was prepared using an equivalent amount of sodium methoxide in methanol and distilling off the methanol. It melted (with decomposition) at 355° C.

EXAMPLE 3

Dimethyl sulphate (63 parts) was added dropwise to a stirred solution of 3-methyl-5-mercapto-1,2,4-thiadiazole (66 parts) and potassium carbonate (69 parts) in water (500 parts). Stirring was continued for 2 hours and the solution then extracted with ether, washed and dried. Evaporation of the chloroform solution gave 3-methyl-5-methylthio-1,2,4-thiadiazole (34 parts, 47% yield), boiling point 103–105° C./22 mm.

Found (percent): C, 32.95; H, 3.85; N, 18.95. $C_4H_6N_2S_2$ requires (percent): C, 32.88; H, 4.14; N, 19.18.

EXAMPLE 4

A mixture of 5-mercapto-3-phenyl-1,2,4-oxadiazole (100 parts), potassium carbonate (39 parts), propargyl bromide (66 parts) and dry acetone (500 parts) was heated at reflux for one hour. The solution was cooled, poured into water and extracted with chloroform. The extract was washed and dried and the solvent evaporated off to give 3-phenyl-5-propargylthio-1,2,4-oxadiazole (90 parts, 74% yield), melting point 39.40° C.

Found (percent): C, 60.59; H, 3.95; S, 15.05. $C_{11}H_8N_2OS$ requires (percent): C, 61.11; H, 3.73; S, 14.80.

EXAMPLE 5

The following compounds were prepared by methods analogous to those of Examples 1 to 4:

(3-methyl-1,2,4-thiadiazol-5-ylthio)acetic acid, M.P. 114–115° C.

(3-phenyl-1,2,4-oxadiazol-5-ylthio)acetic acid, M.P. 101–102° C.

(3-p-chlorophenyl)-5-propargylthio-1,2,4-oxadiazole, M.P. 63–64° C.

3-phenyl-5-methylthio-1,2,4-oxadiazole, B.P. 95° C./0.1 mm.

ethyl (3-phenyl-1,2,4-oxadiazol-5-ylthio)acetate, M.P. 51° C.

(3-phenyl-1,2,4-oxadiazol-5-ylthio)acetamide, M.P. 149–151° C.

3-(3-phenyl-1,2,4-oxadiazol-5-ylthio)propionic acid, M.P. 84° C.

5-methylthio-3-phenyl-1,2,4-thiadiazole, M.P. 76° C.

(3-phenyl-1,2,4-thiadiazol-5-ylthio)acetonitrile, M.P. 110° C.

[3-(p-chlorophenyl)-1,2,4-thiadiazol-5-ylthio]acetic acid, M.P. 205° C.

(3-phenyl-1,2,4-thiadiazol-5-ylthio)acetamide, M.P. 158° C.

3-methyl-5-propargylthio-1,2,4-thiadiazole, M.P. 42° C.

3-(3-phenyl-1,2,4-thiadiazol-5-ylthio)propionic acid, M.P. 86° C.

5-methylthio-3-(p-tolyl)-1,2,4-oxadiazole, B.P. 120° C./1 mm.

Ethyl [3-(p-methoxyphenyl)-1,2,4-oxadiazol-5-ylthio]acetate, M.P. 54–55° C.

[3-(p-tolyl)-1,2,4-oxadiazol-5-ylthio]acetic acid, M.P. 92° C.

[3-(p-methoxyphenyl)-1,2,4-oxadiazol-5-ylthio]acetic acid, M.P. 125° C.

5-propargylthio-3-(p-tolyl)-1,2,4-oxadiazole, M.P. 62° C.

3-(p-methoxyphenyl)-5-propargylthio-1,2,4-oxadiazole, M.P. 82–83° C.

3-(p-chlorophenyl)-5-methylthio-1,2,4-thiadiazole, M.P. 101° C.

3-(p-methoxyphenyl)-5-methylthio-1,2,4-thiadazole, M.P. 109° C.

Ethyl (3-phenyl-1,2,4-thiadiazol-5-ylthio)acetate, M.P. 35° C.

Ethyl [3-(p-methoxyphenyl)-1,2,4-thiadiazol-5ylthio]-acetate, M.P. 82° C.

(3-ethyl-1,2,4-thiadiazol-5-ylthio)acetic acid, M.P. 88° C.

[3-(p-tolyl-1,2,4-thiadiazol-5-ylthio]acetic acid, M.P. 156–158° C.

[3-(p-methoxyphenyl)-1,2,4-thiadiazol-5-ylthio]acetic acid, M.P. 138° C.

5-allylthio-3-phenyl-1,2,4-thiadiazole, B.P. 150° C./1 mm.

3-phenyl-5-propargylthio-1,2,4-thiadiazole, M.P. 76° C.

5-propargylthio-3-(p-tolyl)-1,2,4-thiazole, M.P. 65–66° C.

3-ethyl-5-methylthio-1,2,4-thiadiazole, liquid.

3-ethyl-5-propargylthio-1,2,4-thiadiazole, lqiuid.

5-methylthio-3-propyl-1,2,4-thiadiazole, B.P. 130° C./24 mm.

5-octylthio-3-phenyl-1,2,4-thiadiazole, M.P. 28° C.

3-(p-chlorophenyl)-5-methylthio-1,2,4-oxadiazole, M.P. 49–51° C.

5-ethylthio-3-methyl-1,2,4-thiadazole, B.P. 116–8° C./28 mm.

5-decylthio-3-methyl-1,2,4-thiadiazole, B.P. 140–6° C./0.6 mm.

EXAMPLE 6

A soil composition containing 2 parts dry sand and 1 part sterilized loam was artificially infested with root knot eelworm, Meloidogyne spp., by admixing it with finely chopped nematode infected tomato roots at the rate of 5 grams of root per liter of soil. 750 ml. portions of the infested soil contained in plastic bags were treated with suspensions of the compounds listed below at rates equivalent to 250, 125 and 62.5 and 31 parts per million (weight of compound per volume of soil) and mixed thoroughly. After 5 days' incubation at 28° C., the soil was transferred tp 3 inch (7.6 cm.) diameter pots into which tomato seedlings were planted. The seedlings were grown for 14 days in a controlled environment room (temperature 26° C., relative humidity 65 to 85%, artificial sunlight 14 hours per day of intensity 600 foot-candles) and then removed from the pots and the roots washed and assessed for nematode damage. Assessment was based on a 0 to 4 index of root damage in which 0 signifies no attack by nematodes and 4 signifies very severe root damage and no control of nematodes. The root knot index at each concentration is tabulated below, each value being the mean of three replicates.

| Compound | 250 p.p.m. | 125 p.p.m. | 62.5 p.p.m. | 31 p.p.m. |
|---|---|---|---|---|
| 3-phenyl-5-methylthio-1,2,4-oxadiazole | 0.0 | 0.0 | 0.0 | 1.0 |
| 3-phenyl-5-propargylthio-1,2,4-oxadiazole | 0.0 | 0.0 | 0.0 | 0.0 |
| 3-(p-chlorophenyl)-5-propargylthio-1,2,4-oxadizaole | 0.0 | 0.0 | 0.0 | 0.0 |
| 3-(p-chlorophenyl)-5-methylthio-1,6,4-thiadiazole | 0.0 | | | |
| 3-methyl-5-methylthio-1,2,4-thiadiazole | 0.0 | 0.0 | 0.0 | 1.2 |
| 3-(p-tolyl)-5-methylthio-1,2,4-oxadiazole | 0.0 | 0.0 | 0.1 | 0.3 |
| 3-(p-methoxyphenyl)-5-propargylthio-1,2,4-oxadiazole | 0.0 | 0.0 | 0.0 | 0.0 |
| (3-phenyl-1,2,4-thiadiazol-5-ylthio)acetic acid | 0.0 | 0.1 | 0.6 | |
| 3-(p-tolyl)-5-propargylthio-1,2,4-oxadiazole | 0.0 | 0.0 | 0.0 | 0.0 |
| 3-ethyl-5-methylthio-1,2,4-thiadiazole | | | 0.0 | 0.0 |
| 3-propyl-5-methylthio-1,2,4-thiadiazole | | | 0.0 | 0.0 |
| 3-phenyl-5-methylthio-1,2,4-thiadiazole | | | 0.0 | 0.0 |
| 3-(p-methoxyphenyl)-5-methylthio-1,2,4-thiadiazole | 0.0 | 0.0 | | |
| 3-phenyl-5-allythio-1,2,4-thiadiazole | 0.0 | 0.0 | | |
| 3-ethyl-5-propargylthio-1,2,4-thiadiazole | | | 0.0 | 0.0 |
| 3-phenyl-5-propargylthio-1,2,4-thiadiazole | | 0.0 | 1.7 | 2.0 |
| 3-(p-tolyl)-5-propargylthio-1,2,4-thiadiazole | 0.0 | 0.0 | 0.0 | 0.8 |

EXAMPLE 7

French beans (Phaseolus vulgaris cultivation Canadian Wonder) were sown in John Innes No. 1 potting compost in 3½ inch diameter pots, three seeds to each pot. They were then watered and placed in a controlled environment room (temperature 22° C., relative humidity 65–85%, artificial illumination 1200 foot-candles for 14 hours per day). After seven days, when the first leaves had opened, they were sprayed with an aqueous suspension of [3-(p-chlorophenyl)-1,2,4-oxadiazol-5-ylthio]acetic acid containing 500 p.p.m. of the wetting agent Lissapol NX. The concentrations of active ingredient and volume of application were adjusted so as to be equivalent to rates of 160 ounces in 80 gallons per acre and 80, 40, 20 and 10 ounces in 40 gallons per acre. The plants were then kept in the controlled environment room for a further 14 days and then assessed visually for any growth regulatory or herbicidal effects. All differences from untreated controls were combined to give a score on a scale from 0 to 100, 0 signifying no effect and 100 the death of all plants. Growth inhibition (terminal bud inhibition producing weight reduction) and axillary growth stimulation were graded on a scale from 0 to 3, 0 signifying no effect and 3 maximum effect. Results are summarised below:

| Dosage rate (ounces/acre) | 160 | 80 | 40 | 20 | 10 |
|---|---|---|---|---|---|
| Combined score value (percent | 85 | 65 | 60 | 46 | 35 |
| Growth inhibition (0–3 scale) | 3 | 2 | 1 | 1 | 0 |
| Axillary growth stimulation (0–3) | 1 | 2 | 3 | 3 | 3 |

High initial dosage rates completed inhibited growth, but at lower rates stimulation of axillary growth compensated for inhibition of the terminal bud.

EXAMPLE 8

[3-(p-chlorophenyl)-1,2,4-oxadiazol-5-ylthiol]acetic acid, formulated as an Attaclay/sand dust was incorporated in John Innes No. 1 potting compost at a rate equivalent to 130 and 26 parts per million weight-/volume of active ingredient to soil; these rates are approximately equivalent to 50 and 10 lbs./acre of active ingredient cultivated to a depth of 2 inches. The treated soil was placed in anodised aluminium pans, 7½ ins. long × 3¾ ins. wide × 2 ins. deep and sown with seeds of peas (Pisum satirum), mustard (Sinapis alba), linseed (Linum usitatissimum), maize (Zea mays), oats (Avena sativa) and ryegrass (Lolium sp.). After watering, they were placed in a controlled environment room (temperature 22° C., relative humidity 65–85%, artificial illumination 1200 foot-candles for 14 hours per day) for 21 days. The plants were then visually assessed for growth regulatory or herbicidal effects. All differences from untreated controls were combined in an overall score on a scale from 0 to 100 where 0 signifies no effect and 100 signifies complete suppression. Growth inhibition (both of the terminal bud and overall) and axillary growth stimulation were also assessed separately on a scale from 0 to 3 where 0 signifies no effect and 3 signifies maximum effect. The results are summarised in the following table:

| | Overall score (percent) | | Growth inhibition (0–3) | | Axillary growth stimulation (0–3) | |
|---|---|---|---|---|---|---|
| Species | 130 p.p.m. | 26 p.p.m. | 130 p.p.m. | 26 p.p.m. | 130 p.p.m. | 26 p.p.m. |
| Peas | 10 | 5 | 1 | 0 | 1 | 0 |
| Mustard | 95 | 25 | 3 | 2 | 0 | 0 |
| Linseed | 96 | 20 | 3 | 2 | 2 | 3 |
| Maize | 80 | 3 | 3 | 0 | 0 | 0 |
| Oats | 25 | 8 | 2 | 0 | 0 | 1 |
| Ryegrass | 25 | 0 | 2 | 0 | 0 | 0 |

EXAMPLE 9

Aqueous suspensions of wettable powder formulations of [3-(p-chlorophenyl)-1,2,4-oxadiazol-5-ylthio]acetic acid and (3-phenyl-1,2,4-thiadiazol-5-ylthio)acetic acid respectively were sprayed in the United Kingdom in June on two lengths of apple rootstock hedge at rates equivalent to 18, 6 and 2 pounds per acre of active ingredient, two replicates per treatment. At intervals of 14, 28 and 47 days after treatment, the plants were assessed visually by (a) pre-selecting and measuring two shoots per treatment, (b) estimating increased axially development on a 0 to 3 scale in which 0 signifies no effect, 1 signifies a few small axially shoots, 2 signifies an intermediate level and 3 signifies many large auxiliary shoots, and (c) estimating any leaf scorch and deformity on a 0 to 9 scale in which 0 signifies no effect and 9 signifies complete kill.

Results are tabulated below:

| Compound | Rate. lbs. acre | Days after spraying 0 | 54 | 28 | 47 |
|---|---|---|---|---|---|
| **(a) SHOOT GROWTH (length in cms.)** | | | | | |
| [3-(p-chlorophenyl)-1,2,4-oxadiazol-5-ylthio acetic]acid | 18 | 24 | 26 | 30 | 36 |
| | 6 | 24 | 34 | 41 | 45 |
| | 2 | 24 | 36 | 46 | 53 |
| (3-phenyl-1,2,4-thiadiazol-5-ylthio) acetic acid | 18 | 24 | 33 | 29 | 47 |
| | 6 | 24 | 30 | 33 | 37 |
| | 2 | 24 | 31 | 35 | 40 |
| Untreated controls | | 24 | 39 | 50 | 57 |
| **(b) INCREASED AXILLARY DEVELOPMENT (0 to 3 scale)** | | | | | |
| [3-(p-chlorophenyl)-(1,2,4-oxadiazol-5-ylthio]acetic acid | 18 | 0 | 1 | 3 | 3 |
| | 6 | 0 | 1.5 | 2 | 2 |
| | 2 | 0 | 0.5 | 1 | 1 |
| (3-phenyl-1,2,4-thiadiazol-5-ylthio)-acetic acid | 18 | 0 | 1 | 3 | 3 |
| | 6 | 0 | 1 | 2 | 2 |
| | 2 | 0 | 1 | 2 | 2 |
| Untreated controls | | 0 | 0 | 0 | 0 |

(c) LEAF SCORCH AND DEFORMITY (0 to 9 scale)

(i) [3-(p-chlorophenyl-1,2,4-thiadiazol-5-ylthio]acetic acid

| Days after spraying | Rate. lbs. acre | Scorch Leaves A | Leaves B | Leaves C | Deformity Leaves A | Leaves B | Leaves C |
|---|---|---|---|---|---|---|---|
| 14 | 18 | 7 | 4 | 0 | 0 | 0 | 0 |
| | 6 | 1 | 2 | 0 | 0 | 0 | 0 |
| | 2 | 2 | 1 | 0 | 0 | 0 | 0 |
| 28 | 18 | 0 | 4 | 0 | 0 | 0 | 0 |
| | 6 | 0 | 1 | 0 | 0 | 0 | 0 |
| | 2 | 0 | 1 | 0 | 0 | 0 | 0 |
| 47 | 18 | 0 | 0 | 0 | 0 | 0 | 0 |
| | 6 | 0 | 0 | 0 | 0 | 0 | 0 |
| | 2 | 0 | 0 | 0 | 0 | 0 | 0 |
| **(ii) (3-phenyl-1,2,4-thiadiazol-5-ylthio)acetic acid** | | | | | | | |
| 14 | 18 | 4 | 4 | 0 | 4 | 4 | 1 |
| | 6 | 3 | 2 | 1 | 5 | 2 | 0 |
| | 2 | 2 | 1 | 0 | 3 | 1 | 0 |
| 28 | 18 | 0 | 2 | 0 | 4 | 4 | 1 |
| | 6 | 0 | 1 | 0 | 2 | 2 | 0 |
| | 2 | 0 | 1 | 0 | 1 | 1 | 0 |
| 47 | 18 | 0 | 1 | 0 | 3 | 3 | 1 |
| | 6 | 0 | 1 | 0 | 2 | 2 | 0 |
| | 2 | 0 | 1 | 0 | 1 | 1 | 0 |

NOTE. - Leaves A are small, immature, light green leaves. B are intermediate sizes, light green leaves and C are mature, dark green, fully expanded leaves.

EXAMPLE 10

An aqueous solution of the sodium salt of (3-phenyl-1,2,4-thiadiazol-5-ylthio)acetic acid was sprayed at the rates indicated below on to four varieties of chrysanthemum plants growing in a greenhouse. After 4 weeks, the plants were assessed for growth regulant effect. The results are tabulated below.

| Variety | Rate. lb./acre (acid equivalent) | Result |
|---|---|---|
| (a) Red Galax | 5 | Severe spiral deformity, stunting. Numerous axillary shoots developed. |
| (b) Bonny Jean | 5 | Moderate growth inhibition of the terminal bud. Stimulation of axillary growth. |
| (c) Milestone | 5 | Initial deformation with later recovery. Reduction of height and stimulation of axillary branching. |
| (d) Deep Pink Champagne, | 2½ | Some paleness and deformity. Increase of axillary development. |

EXAMPLE 11

5-chloro-3-phenyl-1,2,4-oxadiazole (36 parts) was added portionwise to a solution of ethyl mercaptoacetate (24 parts) and sodium methoxide (11 parts) in methanol (500 parts). The temperature rose to about 50° C. and the mixture was allowed to stand for three hours. The product was poured into an excess of cold water, and extracted with benzene, washed with water and the solvent then evaporated off. Recrystallisation gave ethyl(3-phenyl-1,2,4-oxadiazol-5-ylthio)acetate (40 parts, 75% yield), melting point 50–52° C.

Found (percent): C, 54.55; H, 4.45; N, 10.90.

$C_{12}H_{12}N_2O_3S$ requires (percent): C, 54.54; H, 4.58; N, 10.60.

I claim:

1. A compound of the formula:

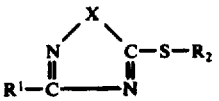

wherein $R^1$ represents [alkyl; alkyl substituted by halogen, alkoxy, carboxy, hydroxy or nitro;] phenyl; or phenyl substituted by halogen, alkyl, alkoxy or nitro, $R_2$ is $—CH_2COOH$ or $—CH_2CH_2—COOH$ X is oxygen or sulphur wherein the alkyl and alkoxy radicals have from 1 to 6 carbon atoms, or a herbicidal or plant *growth* regulant salt; [lower] *herbicidal or plant growth regulant* alkyl ester or unsubstituted amide of such compound.

2. A compound according to claim 1 which is the alkali metal salt.

3. A compound according to claim 2 which is the sodium salt.

4. A compound according to claim 1 which is the lower alkyl ester.

5. A compound according to claim 4 which is the ethyl ester.

6. A compound according to claim 1 which is the unsubstituted amide.

7. A compound according to claim 1 which is the free acid.

8. A compound according to claim 1 wherein $R_1$ is p-chlorophenyl and X is O.

9. A compound according to claim 1 wherein $R_1$ is [p-chloro]phenyl and X is S.

*10. A compound according to claim 1 wherein X is oxygen.*

*11. A compound according to claim 1 wherein $R^1$ is phenyl monosubstituted by halogen, alkyl or alkoxy.*

*12. A compound according to claim 1 wherein $R^2$ is $CH_2COOH$.*

*13. A compound according to claim 4 wherein $R^1$ is phenyl or p-chlorophenyl.*

*14. A compound according to claim 1 wherein $R^1$ is phenyl, X is oxygen and $R^2$ is $CH_2COOH$ or a herbicidal or plant growth regulant salt, lower alkyl ester or unsubstituted amide of such compound.*

*15. A compound according to claim 1 wherein $R^1$ is phenyl, X is oxygen and $R^2$ is $—CH_2CH_2COOH$ or a herbicidal or plant growth regulant salt, lower alkyl ester or unsubstituted amide of such compound.*

*16. A compound according to claim 1 wherein $R^1$ is p-chlorophenyl, X is sulphur and $R^2$ is $—CH_2COOH$ or a herbicidal or plant growth regulant salt, lower alkyl ester or unsubstituted amide of such compound.*

*17. A compound according to claim 1 wherein $R^1$ is phenyl, X is sulphur and $R^2$ is $—CH_2CH_2COOH$ or a herbicidal or plant growth regulant salt, lower alkyl ester or unsubstituted amide of such compound.*

*18. A compound according to claim 1 wherein $R^1$ is p-tolyl, X is oxygen and $R^2$ is $—CH_2COOH$ or a herbicidal or plant growth regulant salt, lower alkyl ester or unsubstituted amide of such compound.*

*19. A compound according to claim 1 wherein $R^1$ is p-methoxyphenyl, X is oxygen and $R^2$ is $—CH_2COOH$ or a herbicidal or plant growth regulant salt, lower alkyl ester of unsubstituted amide of such compound.*

*20. A compound according to claim 1 wherein $R^1$ is p-tolyl, X is sulphur and $R^2$ is $CH_2COOH$ or a herbicidal or plant growth regulant salt, lower alkyl ester of unsubstituted amide of such compound.*

*21. A compound according to claim 1 wherein $R^1$ is p-methoxyphenyl, X is sulphur and $R^2$ is $CH_2COOH$ or a herbicidal or plant growth regulant salt, lower alkyl ester of unsubstituted amide of such compound.*

*22. A compound according to claim 1 wherein $R^1$ is p-chlorophenyl, X is oxygen and $R^2$ is $CH_2COOH$ or a herbicidal or plant growth regulant salt, lower alkyl ester or unsubstituted amide of such compound.*

*23. A compound according to claim 1 wherein $R^1$ is phenyl, X is sulphur and $R^2$ is $CH_2COOH$ or a herbicidal or plant growth regulant salt, lower alkyl ester or unsubstituted amide of such compound.*

*24. A compound according to claim 13 which is the compound itself or the sodium salt, ethyl ester or unsubstituted amide thereof.*

*25. A compound according to claim 14 which is the sodium salt, ethyl ester or unsubstituted amide thereof.*

*26. A compound according to claim 15 which is the sodium salt, ethyl ester or unsubstituted amide thereof.*

*27. A compound according to claim 16 which is the sodium salt, ethyl ester or unsubstituted amide thereof.*

*28. A compound according to claim 17 which is the sodium salt, ethyl ester or unsubstituted amide thereof.*

*29. A compound according to claim 18 which is the sodium salt, ethyl ester or unsubstituted amide thereof.*

*30. A compound according to claim 19 which is the sodium salt, ethyl ester or unsubstituted amide thereof.*

*31. A compound according to claim 20 which is the sodium salt, ethyl ester or unsubstituted amide thereof.*

*32. A compound according to claim 21 which is the sodium salt, ethyl ester or unsubstituted amide thereof.*

*33. A compound according to claim 22 which is the sodium salt, ethyl ester or unsubstituted amide thereof.*

*34. A compound according to claim 23 which is the sodium salt, ethyl ester or unsubstituted amide thereof.*

*35. A compound according to claim 25 which is the ethyl ester.*

*36. A compound according to claim 25 which is the unsubstituted amide.*

*37. A compound according to claim 30 which is the ethyl ester.*

*38. A compound according to claim 32 which is the ethyl ester.*

* * * * *